United States Patent
Heimberger

[15] 3,684,806
[45] Aug. 15, 1972

[54] 2(α-METHYL-α-HYDROXY)-ETHYL-4-MORPHOLINE-6-TRICHLOROMETHYL-5-TRIAZINE

[72] Inventor: Werner Heimberger, Hanau on Main, Germany

[73] Assignee: Geutsche Gold-Und Silber-Schudeamstalt vormals Roessler, Frankfurt on Main, Germany

[22] Filed: June 1, 1970

[21] Appl. No.: 42,488

Related U.S. Application Data

[60] Continuation-in-part of Ser. No. 884,708, Dec. 12, 1969, abandoned, which is a division of Ser. No. 594,647, Oct. 31, 1966, Pat. No. 3,522,255, and a continuation-in-part of Ser. No. 704,237, Feb. 9, 1968, Pat. No. 3,583,986, which is a continuation-in-part of Ser. No. 594,647, Oct. 31, 1966, Pat. No. 3,522,255.

[30] Foreign Application Priority Data

Oct. 30, 1965    Germany ................D 48552

[52] U.S. Cl. ........................260/247.5 R, 424/248
[51] Int. Cl. ..........................................C07d 87/40
[58] Field of Search............................260/247.5

*Primary Examiner*—Alex Mazel
*Assistant Examiner*—Jose Tovar
*Attorney*—Michael S. Striker

[57]    ABSTRACT

2(α-methyl-α-hydroxy)-ethyl-4-morpholino-6-trichloromethyl-s-triazine. The compound has analgesic and anti-inflammatory action.

1 Claim, No Drawings

2(α-METHYL-α-HYDROXY)-ETHYL-4-MORPHOLINE-6-TRICHLOROMETHYL-5-TRIAZINE

CROSS-REFERENCES TO RELATED APPLICATIONS

This application is a continuation-in-part of application Ser. No. 704,237, filed on Feb. 9, 1968, now U.S. Pat. No. 3,583,986 issued on June 8, 1971, which in turn is a continuation-in-part of application Ser. No. 594,647, filed on Oct. 31, 1966 now U.S. Pat. No. 3,522,255. This application is furthermore a continuation-in-part of application Ser. No. 884,708, filed on Dec. 12, 1969 now abandoned which latter application in turn was a division of the above-listed application Ser. No. 594,647, all of which applications were filed by the same inventor in respect of "Substituted Triazines."

DESCRIPTION OF THE INVENTION

The new compound can for instance be prepared by saponifying morpholino-substituted triazines of the formula

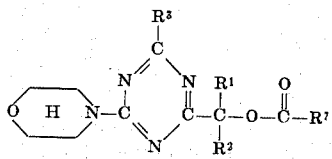

$R^1$ and $R^2$ are methyl, $R^3$ is trichloromethyl and $R^7$ is alkyl or oxy-alkyl of one to six carbon atoms or aryl or hydroxyl aryl, in the presence of a water-miscible organic solvent, especially a lower alkanol, and preferably methanol, and in the presence of about molar quantities of barium hydroxide or sodium hydroxide or potassium hydroxide at a temperature between 0°C and the boiling point of the solvent, preferably between about 50° and 70°C to form the compound of the invention.

The compounds used as starting materials, for example, can be prepared by the process described in German Pat. No. 1,189,999, which corresponds to U.S. Pat. No. 3,264,293 of Aug. 2, 1966.

The compound of the invention for example, provides a strong anti-inflammatory action or antiphlogistic action on carrageen edema of the rat's paw upon oral administration in dosages of 10–100 mg/kg.

The following table indicates the arrest in carrageen edema of the rat's paw upon oral administration of 30 mg/kg of an illustrative compound according to the invention (results in percent of edema arrest as compared to control group) and the acute toxicity of such compounds. The antiphlogistic action investigations were carried out according to the method of Domenjoz and Coll. Arch. Exp. Pharm. Path. 230, 325 (1957), and the acute toxicity tests were carried out according to the method of Miller & Tainter, Proc. Soc. Exper. Biol. and Med. 57, 261 (1944) with a 24 hour observation period.

TABLE

| | Arrest in carrageen edema at 30 mg/kg dosage oral rat % | LD 50 mg/kg rat, oral |
|---|---|---|
| D 9220 | 57 | ca. 2000 |

D 9220 - 2(α-methyl-α-hydroxy)-ethyl-4-morpholino-6-trichloro-methyl-s-triazine.

The compound has good anti-inflammatory activity and the indications as anti-inflammatory agents are as follows:
- chronic arthritis
- illnesses of a traumatic nature
- post-traumatic inflammations
- swellings on fractures
- thrombophlebitis in every form (including post-operative)
- bursitis
- synovitis
- collagenoses (polymyositis, periarthritis)
- gout
- intraperitoneal adhesions The compound of the invention can be used, if desired, also in combination with other medicaments in the form of pharmaceutical compositions suited for enteral and parenteral application.

The enteral administration can, for instance, be effected in the form of tablets, capsules, pills, dragees, suppositories, oily and aqueous solutions or suspensions and emulsions. The parenteral administration can be effected in the form of injectable oily and aqueous solutions or suspensions and emulsions.

The dosage, depending upon the form of administration, can be between 0.1 and 500 mg, one or more times a day.

The following examples will serve to illustrate the invention.

EXAMPLE 1

50 g of 2(α-ethoxycarbonyloxy--α-methyl)-ethyl-4-morpholino-6-trichloromethyl-s--triazine were dissolved in 300 ml of methanol and the solution heated to boiling. 42 g of $Ba(OH)_2 \cdot 8H_2O$ were dissolved in 400 ml of hot methanol and such solution added to the triazine solution over a 3 hour period while the latter was constantly boiled. The triazine solution which initially was clear became cloudy as the saponification proceeded upon addition of the $Ba(OH)_2$ solution. The reaction mixture was then boiled down without first separating the solids and the residue stirred up with dilute HCl whereupon $CO_2$ was set free. The water-insoluble portion was taken up in methylene chloride. After such solution had been washed neutral it was boiled down. The residue was triturated with water whereupon it crystallized. The yield of 2(α-methyl-α-hydroxy)-ethyl-4-morpholino-6-trichloromethyl-s-triazine was 18 g or 43.5 percent of theory. Its melting point was 72°–82°C.

EXAMPLE 2

114 g of 2(α-methoxy carbonyloxy-α-methyl)-ethyl-4-morpholino-6-trichloromethyl-s-triazine (m.p. 90°–95°C) were dissolved in 500 ml of methanol and a solution of 90 g of $Ba(OH)_2 \cdot 8H_2O$ in 750 ml of methanol added thereto over a 30 minute period. The mixture was then refluxed for 1½ hours. The reaction solution was then adjusted to a pH of 5 with concentrated HCl whereby $CO_2$ was liberated and the solution concentrated under vacuum. The residue was stirred up with water whereby 51 g of 2(α-methyl-α-hydroxy)-ethyl-4-morpholino-6-trichloromethyl-s-triazine were obtained.

The following table gives the formulas of the starting materials and products of the examples. For simplicity the triazine ring

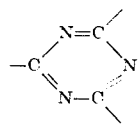

will be represented therein by the symbol

| Example | Starting material | End product |
|---|---|---|
| 1 | Cl₃C—△—C(CH₃)₂OCOC₂H₅ (with N H O ring) | Cl₃C—△—C(CH₃)₂—OH (with N H O ring) |
| 2 | Cl₃C—△—C(CH₃)₂OCOCH₃ (with N H O ring) | Cl₃C—△—C(CH₃)₂OH (with N H O ring) |

What is claimed as new and desired to be protected by Letters Patent is set forth in the appended claim:

1. The compound which is 2(α-methyl-α-hydroxy)-ethyl-4-morpholino-6-trichloromethyl-s-triazine.

* * * * *